Aug. 16, 1966 P. S. FUSS 3,267,296

SELF-BIASED THRESHOLD CIRCUIT

Filed July 20, 1964

INVENTOR
P. S. FUSS
BY
Charles Scott Phelan
ATTORNEY 3,267,296

SELF-BIASED THRESHOLD CIRCUIT

Peter S. Fuss, Randolph Township, Morris County, N.J., assignor to Bell Telephone Laboratories, Incorporated, New York, N.Y., a corporation of New York Filed July 20, 1964, Ser. No. 383,995
2 Claims. (Cl. 307—88.5)

Figure 1:
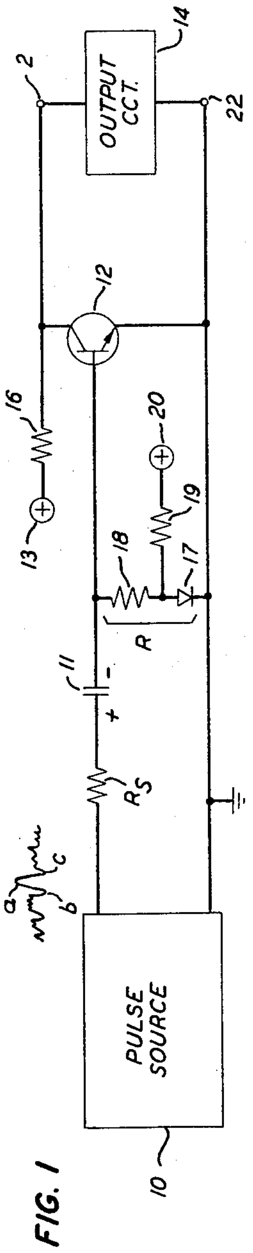

This invention relates to a self-biased threshold circuit. More particularly, the invention relates to such a threshold circuit which is useful in connection with the stabilization of the amplitudes and occurence times of pulses in electric circuits.

In certain electric circuit systems utilizing pulse signals it is necessary to stabilize pulse amplitude, base-clip noise skirts on the pulse signals, and to perform the stabilization and clipping functions with considerable uniformity in spite of atmospheric variations in the system environment and without appreciable time jitter in the stabilized pulses. The delay line time compressor disclosed and claimed in my copending application Serial No. 518,513, filed December 16, 1965, entitled "Digital Time Compressor With Self-Biased Threshold," which is a division of the present application, is an example of such a system. Prior art circuits which are adapted for performing both such stabilization and clipping functions are complex and, therefore, relatively costly in terms of parts and maintenance adjustments. Furthermore, other prior art circuits which perform the clipping function necessarily depend upon receiving pulse input signals of already-stabilized amplitude if leading edge time jitter in the clipped output is to be avoided.

Accordingly, it is one object of the present invention to improve pulse stabilizing circuits.

Another object is to improve the time stability of pulse clipping circuits.

A further object is to convert pulses of variable amplitude, and having associated noise, into corresponding pulses of substantially uniform noise-free configurations.

These and other objects of the invention are achieved in a self-biased threshold circuit which is adapted to base-clip incoming signal pulses at a clipping threshold that varies with variations in the input signal level to the circuit to reject noise below such threshold. The threshold circuit is also adapted to limit the pulse portion utilized after clipping to a substantially uniform amplitude.

It is one feature of the invention that the pulse stabilizing circuits are relatively simple and insensitive to changes in atmospheric conditions and component tolerances.

Another feature is that the operating bias level of the theshold circuit is arranged to cause signal clipping at levels which are a constant percentage of the signal waveshape and which are reasonably anticipated to exclude noise.

It is a further feature that pulse limiting is accomplished by a current switching device having an operating signal threshold magnitude which is for practical purposes insignificant compared to the magnitude of the aforementioned clipping levels.

Still another feature of the invention is that the clipping threshold of the circuit is controlled by a resistance-capacitance self-bias circuit for the switching device.

Figure 2B:
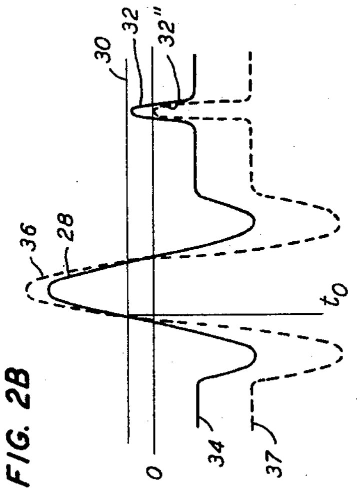
Figure 2A:
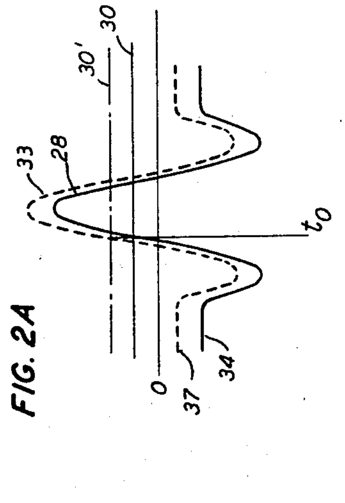

A complete understanding of the invention and its various features, objects, and advantages, may be obtained from a consideration of the following detailed description, and the appended claims, in connection with the attached drawing in which:

FIG. 1 is a schematic diagram of self-biased threshold circuit in accordance with the invention; and FIGS. 2A and 2B include wave diagrams illustrating the operation of the circuit in FIG. 1.

The self-biased threshold circuit of FIG. 1 is a circuit which is designed to stabilize the amplitude and occurrence time of pulses coupled thereby from a pulse source 10 to an output circuit 14. Positive-going pulses from source 10 may vary in amplitude, causing a change in leading edge slope; but otherwise they have substantially uniform configuration. Many of these pulses in a practical system also have noise skirts associated therewith as indicated in exaggerated form by the pulse wave shown adjacent to source 10. The pulse itself, apart from noise skirts, has a principal positive peak *a* between two smaller negative peaks *b* and *c*. This is sometimes called a tripolar pulse and is characteristic of pulses emitted by certain broadband video delay means (not shown) in response to the insertion therein of a simple rectangular pulse having a direct component that is not transmitted by the delay means. The pulse peak *a* corresponds, of course, to the rectified envelope of a radio frequency burst of energy produced by more conventional narrow band delay lines (not shown) for each input pulse.

The pulses from source 10 are applied by a resistor $R_s$ and a capacitor 11 to the base electrode of a transistor 12. The resistor $R_s$ is a schematic representation of the internal resistance of the pulse source 10. Other operating potentials are applied to transistor 12 by a potential source 13 and a resistor 16. The source 13 is schematically represented by a circled plus sign to indicate any suitable source of direct potential having its positive terminal connected to the circuit where the circled plus sign is shown, and having a negative terminal grounded.

The initial positive-going pulses from source 10 forward bias the base-emitter junction of transistor 12 to cause conduction therein, and the transistor base current charges capacitor 11. The charge current tends to develop a charge voltage with the polarity indicated in FIG. 1. Each time the pulse potential from source 10 decays to a point at which it has a lower magnitude than the charge potential on capacitor 11, the transistor 12 lapses into a nonconducting condition. In the interval when transistor 12 is nonconducting between pulses from source 10, capacitor 11 partially discharges through resistor $R_s$, the forward conduction impedance of a diode 17, and a resistor 18. Diode 17 is maintained in a forward conduction condition by connection through a resistor 19 to a positive potential source 20. The sum of the forward conducting impedance of diode 17 and of the resistance of resistor 18 is indicated by reference character R in FIG. 1. Diode 17 permits reverse current components to flow in the shunt branch up to the current supplying capacity of source 20. The presence of diode 17 in the shunt branch offsets the effect of the base-emitter junction drop in transistor 12. In other words, the potential difference developed across diode 17 tends to forward bias the transistor 12 toward condition, and such bias tracks temperature changes in step with corresponding changes in the turn-on characteristic of transistor 12.

The resistance R is proportioned in relation to the resistance of resistor $R_s$, the capacitance of capacitor 11, and the duty cycle of output pulses from source 10 so that a substantial proportion of the charge accumulated on capacitor 11 during a pulse is dissipated before the occurrence of the next succeeding pulse. However, resistance R also has a further limitation imposed. The time constant of the discharge circuit through resistance R must be such that, during the longest anticipated discharge interval between trains of successive pulses from source 10, the charge potential ultimately remaining on capacitor 11 must be of such polarity and magnitude that together with any direct current component of the pulse trains from source 10, it is unable to bias transistor 12 into conduction. The circuit of FIG. 1 is herein described in terms of positive input pulses that are large with respect to the base-emitter voltage required to turn transistor 12 on, and such pulses leave a correspondingly large charge on capacitor 11 with the polarity indicated in FIG. 1. However, there are other possible arrangements. For example, positive input pulses that are small with respect to the base-emitter voltage required to turn transistor 12 on operate with a small remanent charge on capacitor 11 that has a polarity the reverse of that illustrated but of insufficient amplitude alone to actuate transistor 12. In either case, the charge left on capacitor 11 between pulses, or between pulse trains, must be insufficient to cooperate with the direct current component of signals from source 10 to turn transistor 12 on.

In the case where large positive signals are provided by source 10, variations in the base-emitter turn-on potential of transistor 12, resulting from ambient conditions or other factors, will have negligible practical effect upon the time at which transistor 12 is biased into conduction in relation to the time base of pulses from source 10. However, even where small input signals are provided, the circuit operates inherently to actuate transistor 12 at a stable time in relation to such time base as will be subsequently described.

The bias and operating circuits coupled to transistor 12 are so arranged that when the forward biasing potential form source 10 does bias transistor 12 into conduction, the transistor operates in a saturated conduction condition to function as a limiter. Thus, each output pulse appearing at the terminals 21 and 22 connected to the collector and emitter electrodes, respectively, of transistor 12 is of substantially the same magnitude as every other pulse appearing at those output terminals.

It can be shown by well known circuit analysis techniques that the amplitude proportion of each pulse from source 10 during which transistor 12 conducts is a function of the duty cycle of source 10, and the proportion is also approximately a function of the ratio $R_S/R_S+R$. The duty cycle for the wave of pulses from source 10 is constant, and the waveshape of individual pulses from source 10 is also uniform. The resistance ratio is advantageously proportioned with respect to the capacitance of capacitor 11 in one embodiment so that the time constant of the discharge circuit of the capacitor is much greater than the time interval between two successive pulses from source 10. That time constant is also greater than the longest anticipated intervals of successive pulses or of no pulses. Such intervals would correspond in a binary-coded signal wave to a train of successive ONES or an interval of successive ZEROS, respectively. Typically the time constant is made about five times greater than such longest interval. Usually the ratio $R_S/R_S+R$ is advantageously set so that transistor 12 conducts during approximately the top one-third to one-half of each pulse from source 10. Thus, in a practical system the lower magnitude portion of each such pulse, which in such system is likely to have significant noise skirts associated therewith, is excluded from the base electrode of transistor 12. This type of control of the conducting interval of the transistor, in which control is exerted by passive resistance and capacitance elements, is easily adapted to frequency ranges which are much higher than those for which automatic gain control circuits for stabilizing the outputs of amplifiers can be easily and economically provided.

It will be hereinafter shown in greater detail that triggering of the transistor 12 in the circuit of FIG. 1 always occurs at approximately the same point in the time interval of each pulse from source 10 regardless of long time amplitude variations in the pulses from that source. The reason for this is that the ratio $R_S/R_S+R$ represents a signal amplitude percentage determining factor for input waves with a constant duty factor and pulse waveshape. Thus, if the elements $R_S$ and R are proportioned to permit transistor 12 to conduct during the upper one-third of the amplitude of incoming pulses, the triggering time of transistor 12 remains substantially constant because the input pulses attain the seventy percent point of their final amplitude level at approximately the same time regardless of long time variations in the peak pulse amplitude.

It will be recognized by those skilled in the art that the circuit of FIG. 1 is similar in schematic appearance to the circuits of direct current restorers and of some differentiating circutis. However, the circuit parameters and nature of operation of, as well as the results produced by, the circuit of FIG. 1, are quite different from those of either a restorer or a differentiator. All three circuits have a signal source, a series-connected capacitor, and a shunt-connected resistance. The restorer also has a shunt-connected diode, and the threshold circuit of FIG. 1 has a somewhat similar asymmetrically conducting impedance represented by the base-emitter junction of transistor 12.

The shunt resistance in a restorer circuit is usually very large with respect to the source resistance, e.g., two to three orders of magnitude greater; but in the threshold circuit the shunt resistance R is of the same order of magnitude as the source resistance $R_S$, e.g., approximately three times larger than $R_S$, the exact relationship depending upon the duty cycle of the input signal.

The driving signal source which supplies signals to a direct current restorer is generally arranged to have a negligibly small source resistance compared to the forward conducting resistance of the restorer shunt diode when conducting at the signal peak in order to prevent distortion. In the self-biased threshold circuit the corresponding source resistance $R_S$ is assigned a value for the radio $R_S/R_S+R$, which value is much larger than the forward conducting resistance of the base-emitter junction of transistor 12. Typically $R_S$ is about ten times larger than the transistor junction resistance, and severe distortion is thereby intentionally produced.

The time constant of a direct current restorer is usually designed to be of the same order of magnitude as the duration of an individual pulse. However, in a self-biased threshold circuit the time constant must not only be greater than a pulse period, but it must also be substantially greater than the duration of the longest train of successive similar input pulses.

The previously outlined structural differences between a direct current restorer circuit and the self-biased threshold circuit of the present invention produce significant functional differences in the operations of the two circuits which produce the unique results described herein. Thus, the restorer generally operates on the peak of an input signal wave, whereas a self-biased threshold circuit operates at a substantial percent down from a peak of the input signal. The restorer operation is essentially independent of input signal pulse shape and duty cycle, but the threshold circuit requires a substantially constant input pulse shape and duty cycle in order to achieve the desired operation at a substantially uniform percent down from the input signal peak amplitude. A restorer circuit level-shifts an input signal with substantially no distortion, and a self-biased threshold circuit accomplishes a limited amount of level shifting with intentionally injected essential distortion of a predetermined percentage of the signal amplitude. The output of a direct current restorer comprises a level-shifted input signal, all of which appears in the absence of conduction in the restorer shunt diode; but in a self-biased threshold circuit the desired output signal represents the distorted part of the input signal and appears during the conduction of a shunt asymmetrically conducting device which, in the case of FIG. 1, is the base-emitter junction of transistor 12.

In differentiator circuit applications, the circuit parameters are designed to dissipate the accumulated capacitor charge almost instantaneously subsequent to each input pulse transition. This is necessary to enable the differentiator to be fully responsive to both the leading and the trailing edges of each input pulse. However, in the circuit of FIG. 1 the parameters are designed to retain a substantial proportion of the accumulated charge to accomplished the base-clipping function at the occurrence time of a succeeding pulse.

A pulse wave 28 is illustrated in each of the FIGS. 2A and 2B together with an indicated threshold voltage level 30 to show the response of the circuit of FIG. 1 to different conditions that disturb prior art circuits. Pulse 28 is a typical pulse in the output of source 10, and voltage 30 is the circuit threshold clipping level used for excluding noise skirts. The time scale of abscissas has been radically expanded and the voltage scale of ordinates restricted in order to illustrate better the time jitter action hereinbefore mentioned. The zero reference for each wave form is arbitrarily located as shown in FIGS. 2A and 2B in order to facilitate the consideration of the wave forms. The actual position of the reference in any embodiment depends upon the nature of the source 10 and whether or not the wave it provides has a direct-current component. Of course, at the base electrode of transistor 12 the pulse 28 has a zero reference level at the average level 34 thereof because of the direct-current blocking effect of capacitor 11.

In FIG. 2A it is assumed that a temperature change causes a change in the characteristics of transistor 12 in FIG. 1 so that a larger base-emitter voltage is required for turn-on. This change increases the threshold to the level 30'. Each increment of the change causes the transistor to conduct for a somewhat shorter time and to be off for a longer time thereby reducing the average charge on capacitor 11. The charge change results in a compensating level shift in the effective input signal to restore the change-discharge equilibrium fixed by the previously discussed ratio $R_s/R_s+R$. The level shifting thus automatically accomplished by the self-biased threshold circuit is indicated by the broken-line pulse wave form 33 in FIG. 2A. Consequently, the thresholding device, transistor 12, continues to be effective at substantially the same percentage down from the pulse peak, with reference to the average levels 34 and 37, respectively, of the waves. In other words, the wave 28 crosses level 30 at a time $t_0$, and the shifted wave 33 crosses the shifted level 30' at time $t_0$. Thus there is no time jitter.

It is now assumed in connection with wave 28 in FIG. 2B that some factor, such as temperature influence on the attenuation characteristic of some circuit device in source 10, causes the output pulses therefrom to have a larger amplitude as indicated by the broken-line wave 36 in FIG. 2B. An automatic gain control, if provided on source 10, could take over to pull the wave form back to the configuration of the wave 28, but the relatively inexpensive and simple self-biased threshold circuit of FIG. 1 operates in spite of such signal variations and thus does not require an automatic gain control. The present self-biased threshold circuit is adapted as previously described to maintain an equilibrium condition in which the pulse 36 is clipped at approximately the same percentage down from its peak excursion as the wave 28 had been clipped, the percentage being determined for the wave by the resistance ratio $R_s/R_s+R$. Both the positive-going and negative-going pulse portions of pulse 36 are increased in size with respect to voltage level 30. The net effect on the voltage level 30 with respect to ground at which transistor 12 is turned on is zero, but that same voltage level with respect to the average value 37 of pulse 36 is still approximately the same percentage down from the peak of pulse 36. The time at which the waves 28 and 36 cross the voltage level 30 remains the same, i.e., $t_0$, so the pulse amplitude change produces no time jitter in the time when transistor 12 is turned on. Since the pulse changes represented by pulse 36 were effective with respect to the threshold level 30 instead of the average value of the pulse, the resulting noise pulse 32'' is further removed from threshold 30 than is noise pulse 32. Thus, the circuit designer can safely rely upon his design misalignment margin and be assured that no signals in circuits controlled by the output of the threshold circuit will be lost or distorted.

Although the present invention has been described in connection with a particular embodiment and application thereof, it is to be understood that additional embodiments and applications which will be apparent to those skilled in the art are included within the spirit and scope of the invention.

What is claimed is:

1. In combination, a source of pulses of variable average magnitude, each said pulse having a sloping leading edge and at least some of said pulses having associated noise skirts, a capacitor, a transistor having base, emitter, and collector electrodes, said base and emitter electrodes having a threshold of conduction at a predetermined voltage and being connected in series with said capacitor to receive pulses from said source for charging said capacitor, said transistor being normally nonconducting in the absence of an input pulse of greater magnitude than the charge voltage on said capacitor, resistance means connected to shunt said base and emitter electrodes for discharging said capacitor, said resistance means including bias means for offsetting said predetermined voltage, the magnitude of said resistance means being proportioned with respect to the magnitude of said capacitor to dissipate between successive ones of said pulses a substantial proportion of the charge accumulated on said capacitor during a pulse, said proportion being adapted so that said charge voltage is at least equal to the magnitude of said noise skirts but less than the magnitude of the smallest one of said pulses, and an output circuit connected between said collector and emitter electrodes.

2. In combination, a source of signal pulses of predetermined duration and occurring in a random manner with a substantially constant duty cycle and having a predetermined maximum time interval of occurrence of successive pulses or of no pulses, said source having a predetermined effective resistance $R_s$, each of said pulses having substantially the same configuration but variable amplitudes, a transistor having base, emitter and collector electrodes, a capacitor connected in series with said base and emitter electrodes to receive pulses from said source for charging said capacitor, the charging circuit for said capacitor including said base and emitter electrodes and said resistance $R_s$, resistance means including a diode and having a total resistance R, said resistance means connected between said base and emitter electrodes, means biasing said diode in a conducting condition to develop a potential difference normally biasing said base electrode toward conduction, the time constant of said charging circuit being longer than said predetermined interval whereby said transistor is biased into conduction in response to only a predetermined amplitude portion of each of said pulses, said portion being a function of the ratio $R_s/R_s+R$ so that the conduction of said transistor in response to each of said pulses occurs at the same predetermined time in each pulse regardless of long-time variations in amplitudes of said pulse, and utilization means coupled to said collector electrode and responsive to conduction in said transistor.

References Cited by the Examiner

UNITED STATES PATENTS

| | | | |
|---|---|---|---|
| 2,821,626 | 1/1958 | Freedman | 328—115 |
| 2,870,328 | 1/1959 | Pomeroy | 328—115 |
| 2,961,535 | 11/1960 | Lanning | 328—55 |
| 2,972,705 | 2/1961 | Howells | 307—88.5 X |
| 3,150,324 | 9/1964 | Hallden et al. | 328—56 |
| 3,193,732 | 7/1965 | Jamieson et al. | 307—88.5 |

ARTHUR GAUSS, *Primary Examiner.*

DAVID J. GALVIN, J. ZAZWORSKY, *Assistant Examiners.*